March 12, 1935. E. W. PITTMAN 1,994,110
OIL AND GAS SEPARATOR
Filed April 11, 1933 2 Sheets-Sheet 1

INVENTOR
Ernest Waller Pittman

March 12, 1935.  E. W. PITTMAN  1,994,110

OIL AND GAS SEPARATOR

Filed April 11, 1933   2 Sheets-Sheet 2

INVENTOR

Ernest Waller Pittman

Patented Mar. 12, 1935

1,994,110

UNITED STATES PATENT OFFICE 1,994,110

OIL AND GAS SEPARATOR

Ernest Waller Pittman, Beaumont, Tex., assignor to The Petroleum Iron Works Company of Texas, Beaumont, Tex.

Application April 11, 1933, Serial No. 665,613

2 Claims. (Cl. 183—2.7)

My invention relates to improvements in oil and gas separators commonly used adjacent to oil wells for effecting separation of the oil and gas. I attain this object by passing the oil and gas through a separator tank in which the gas is scrubbed against the sides of the tank and against interior baffles as hereafter described and illustrated by attached drawings.

Figure 1:
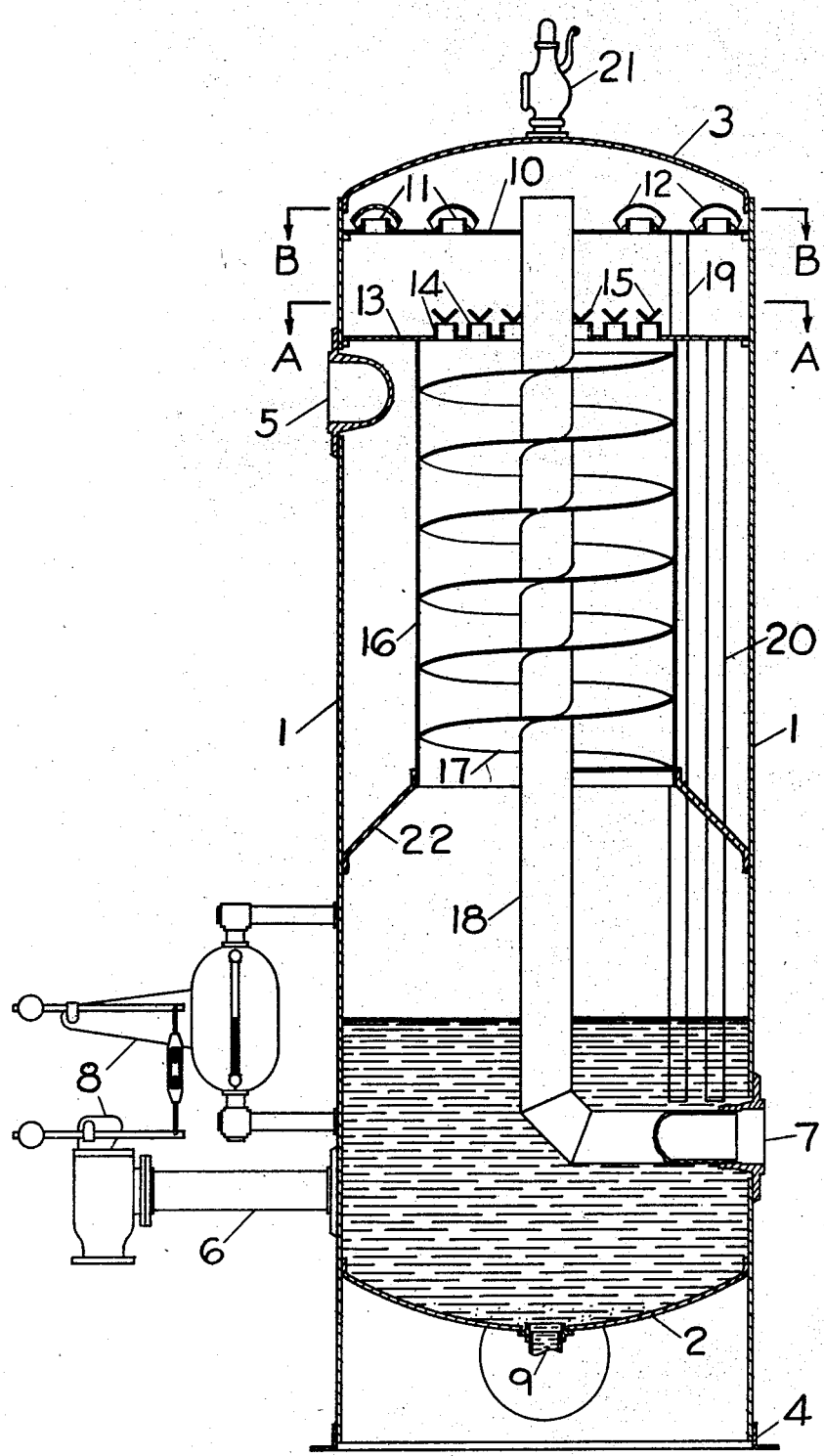
Figure 2:
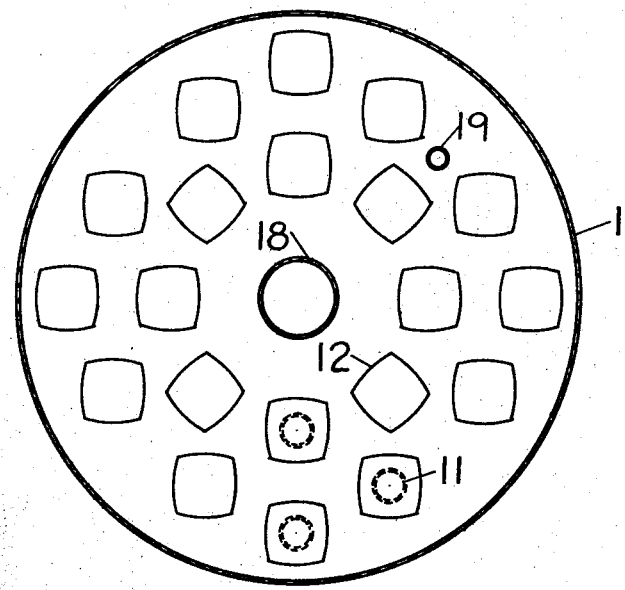
Figure 3:
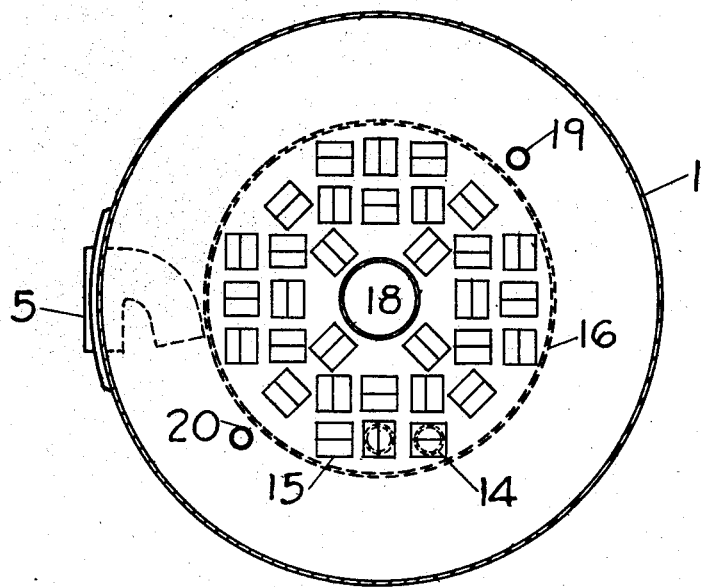

Figure 1 is a sectional elevation of tank. Figure 2 is a cross section of tank on line BB, and Figure 3 is a cross section of tank on line AA.

Referring to Figure 1, the tank comprises the following parts: Outer shell 1, bottom dished head 2, top dished head 3, base angle support 4, oil and gas inlet 5, oil outlet 6, gas outlet 7, liquid level control apparatus 8, bottom sediment drain 9, top baffle tray 10, nozzles 11, baffle caps 12, lower baffle tray 13, nozzles 14, baffle angles 15, inner drum 16, spiral baffle 17, center gas pipe 18, drain 19 from top tray, drain 20 from lower tray, safety valve 21, and braces 22.

Similar numerals refer to similar parts throughout the several views.

Parts 1, 2, and 3 are welded or riveted together to form a gas and liquid tight container which is supported in a vertical position by the circular base angle 4. Trays 10 and 13 are welded continuously to shell 1 and center pipe 18, forming a chamber or compartment at the top of the separator, which is connected to the chamber below only through nozzles 11, and a chamber or compartment immediately below, which is connected to the spiral passage, formed by baffle 17 and drum 16, only by funnels 14. Drum 16 is welded continuously to tray 13, forming two chambers or compartments, one of which consists of the space between the outer shell 1 and the inner drum 16, and the other which consists of the space between the inner drum 16 and the center pipe 18. Spiral baffle 17 consists of a series of hollow circles of metal which have been split on a line joining a point on the greater circumference of the hollow circle and its center and then formed and welded one to another to make a continuous helix of metal. Part 17 is made to fit the inside of drum 16 and the outside of center pipe 18 so that a spiral passage is formed inside the compartment enclosed by parts 13, 16, and 18. Braces 22 are used to assist in supporting drum 16 and to maintain the baffles in a central position. The level of the oil within the separator is maintained at the desired position by an arrangement of valves and levers 8 which opens the oil outlet line 6 when the oil level rises above a predetermined level and closes said line when the oil level falls below the predetermined level. Drain 9 is provided so that sediment may be removed from the bottom of the separator. Safety valve 21 is provided to release any pressure greater than that for which the separator is designed. Drain 19 is welded to trays 10 and 13 and provides a passage, for oil separated in the top chamber, to a point below the level of the oil in the bottom of the separator. Drain 20 is welded to tray 13 and provides a passage, for oil separated in the chamber formed by parts 10, 13, and 1, to a point below the level of the oil in the bottom of the separator. All parts of the well fluid enter the separator through a deflecting inlet 5 which in conjunction with the shell 1 imparts to them a rotary motion within the chamber between parts 1 and 16. In the case of the heavier portions of the fluid; namely, oil, water, and sediment, the force of gravity causes them to fall to the bottom of the separator where they separate according to their respective gravities, the sediment going to the extreme bottom of the separator the water floating thereon and the oil floating on top. The sediment and water are removed as often as necessary through drain 9 and the oil is removed automatically by the arrangement of valves and levers 8, as before described. The gas entering the separator continues its rotary motion until it is forced by more incoming gas below the lower edge of the inner drum 16 into the spiral passage formed by baffle 17. While the gas is passing through this spiral passage, it is scrubbed on the center pipe 18, the inner drum 16 and on both the top and bottom sides of the baffle 17. The gas which has passed through the spiral passage is forced through the nozzles 14 on top of which are placed deflectors 15 which baffle the flow of gas and induce a high state of turbulence in the space between trays 10 and 13, thus preventing the gas from taking a short direct path through the openings in the top tray 10 and carrying with them droplets of oil which should be deposited while the gas is between trays 10 and 13. The gas then passes through nozzles 11 and impinges upon the concave surfaces of baffles 12 from which it is directed into the uppermost chamber of the separator and thence down the center pipe 18 and out of the gas outlet 7.

It will be seen that with this construction I secure a full separation of the gas from the oil. This is due to the fact that the incoming gas and oil are given a rotary movement by the tangential inlet pipe 5 which causes the gas to be scrubbed against the surfaces of the container and the drum 16, that the gas rises upward gravitationally through the spiral passage formed by the baffle 17, the drum 16 and the pipe 18 and that as it passes through this unobstructed spiral passage it is scrubbed against the wall 16, the pipe 18 and the baffle plate 17. Thus any oil carried upward with the gas or separated therefrom flows down this spiral baffle plate back into the lower end of the container. Furthermore, when the gas passes upward through the baffle plates 10 and 13 a great deal of turbulence is caused and this further detaches any droplets of oil from the gas, the pure gas passing downward in the pipe 18 and the oil which may be collected upon the plates 10 and 13 being carried downward through the pipes 19 and 20. It has been found in actual practice that gas separated from oil by the mechanism which I have disclosed is entirely dried and that the two upper baffle plates secure a full and complete separation of the gas and oil.

I claim:

1. Means for separating gas from oil including a container having a wall extending across its upper portion and defining a chamber above said wall, a drum extending downward from said wall of the chamber and spaced from the wall of the container, the drum terminating short of the lower end of the container, the container having an inlet below the chamber and discharging in a circumferential direction into the space between the drum and the circumferential portion of the container, a gas outlet pipe extending from the upper end of said chamber centrally downward through the container and discharging through the wall thereof, a spiral baffle disposed helically around the gas outlet pipe and extending to the drum and defining a spiral passage extending unobstructedly from the lower end to the upper end of the drum, the drum below said spiral passage being open and entirely unobstructed, the partition wall of said chamber having perforations immediately above the drum and formed with baffles extending thereover, a baffle plate disposed above the partition but below the top of the gas discharge pipe having perforations and baffles extending over the perforations, drain pipes conducting oil collected on said baffle plates into the lower portion of the container, and means for maintaining a constant level of oil in the lower portion of said container below the drum.

2. Means for separating gas from oil including an outer substantially cylindrical container having an outer wall, the container being formed at its upper end to provide a chamber having a lower wall, a drum extending downward from the lower wall of the chamber, the drum being spaced from the wall of the container and the lower end of the drum being disposed a substantial distance above the lower end of the container, a spiral baffle extending upward through the entire length of the drum and having the same radius as the drum and with the drum forming a spiral passageway entirely unobstructed from one end to the other, the drum being open and unobstructed below the lower end of the spiral baffle, the lower wall of the chamber immediately above the drum having a plurality of apertures and baffles coacting therewith, means for admitting mixed gas and oil into the upper portion of the container outward of the drum in a circumferential direction whereby to cause rotary movement of the gas and oil within the space between the drum and the container wall in the same direction as the pitch of the spiral baffle, means for maintaining the oil collected on the bottom of said container at a level below the lower end of the drum, means for carrying off the gas collected in said chamber, and means for conducting oil collected in said chamber into the lower end of the container.

ERNEST WALLER PITTMAN.